(12) United States Patent
Smith

(10) Patent No.: US 9,373,919 B1
(45) Date of Patent: Jun. 21, 2016

(54) ADJUSTABLE METAL-CLAD CABLE/FLEXIBLE METALLIC CONDUIT ELECTRICAL CONNECTOR

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 14/803,625

(22) Filed: Jul. 20, 2015

(51) Int. Cl.
H01R 4/66 (2006.01)
H01R 13/73 (2006.01)

(52) U.S. Cl.
CPC ...................... *H01R 13/73* (2013.01)

(58) Field of Classification Search
CPC .................. H01R 4/64; H01R 5/202
USPC ................ 439/92, 100, 799, 777, 83, 98, 833
See application file for complete search history.

(56) References Cited

U.S. PATENT DOCUMENTS

| | | |
|---|---|---|
| 1,644,306 A | 10/1927 | Ledbetter |
| 1,769,947 A | 7/1930 | Fullman |
| 1,810,958 A | 6/1931 | Fullman |
| 1,850,792 A | 3/1932 | Frederickson |
| 2,413,927 A | 1/1947 | Robertson |
| 2,485,676 A | 10/1949 | Thomas, Jr. |
| 2,490,253 A | 12/1949 | Buchanan |
| 2,540,999 A | 2/1951 | Thomas, Jr. |
| 2,973,212 A | 2/1961 | Rose |
| 3,183,297 A | 5/1965 | Curtiss |
| 3,746,373 A | 7/1973 | Prudente |
| 4,990,721 A | 2/1991 | Sheehan |
| 5,539,152 A | 7/1996 | Gretz |
| 5,616,036 A * | 4/1997 | Polidori ............... H01R 4/60 248/74.1 |
| 5,775,739 A | 7/1998 | Gretz |
| 5,789,706 A | 8/1998 | Perkins |
| 5,911,585 A * | 6/1999 | Zwit .................. H04R 4/643 439/100 |
| 6,064,009 A | 5/2000 | Jorgensen et al. |
| 6,140,582 A | 10/2000 | Sheehan |
| D473,783 S | 4/2003 | Kiely |
| D479,984 S | 9/2003 | Kiely |
| 6,935,891 B2 | 8/2005 | Kiely |
| D518,791 S | 4/2006 | Kiely |
| 7,022,914 B1 | 4/2006 | Kiely |
| D530,678 S | 10/2006 | Kiely |

(Continued)

OTHER PUBLICATIONS

"Thomas & Betts 3307M Insulated Connector 2 Inch Malleable Iron 2-Screw Clamp Mount," cesco.com, Cat #: 3307M, Part#: 195578, SKU: 101740; http://www.cesco.com/b2c/product/101740.

*Primary Examiner* — Phuongchi T Nguyen
(74) *Attorney, Agent, or Firm* — Ware, Fressola, Maguire & Barber LLP

(57) ABSTRACT

An adjustable electrical connector for connecting to cable or conduit by a strap adjustment member has a body with a hollow cylindrical section and an extension member. The hollow cylindrical section has a slot and a threaded bore passing therethrough. The slot allows passage of a stop plate, and the threaded bore receives an adjustment screw. The connector has an insulator having a bushing at one end to be inserted into the hollow cylindrical section of the body, and a curved member attached to the hollow cylindrical bushing, the stop plate extending radially outward from the curved member, the stop plate movable by the adjustment screw between a minimum deflection and a maximum deflection to stop the sheath of the cable.

29 Claims, 15 Drawing Sheets

(56) References Cited

U.S. PATENT DOCUMENTS

| | | |
|---|---|---|
| 7,329,144 B1 | 2/2008 | Gretz |
| 7,432,452 B2 | 10/2008 | Gardner |
| 7,442,079 B1 | 10/2008 | Gretz |
| 7,485,806 B1 | 2/2009 | Gretz |
| 7,901,222 B2 | 3/2011 | Dixon et al. |
| 7,952,034 B2 | 5/2011 | Kiely et al. |
| 8,105,096 B2 | 1/2012 | Dixon et al. |
| 8,129,634 B2 | 3/2012 | Sheehan et al. |
| 8,476,541 B1 | 7/2013 | Kiely |
| 2011/0290550 A1 | 12/2011 | Kiely |

* cited by examiner

ADJUSTABLE METAL-CLAD CABLE/FLEXIBLE METALLIC CONDUIT ELECTRICAL CONNECTOR

TECHNICAL FIELD

The present invention relates to electrical fittings, in particular, electrical connectors for connecting metal-clad cable (MC) or flexible metallic conduit (FMC) to a panel box or the like, wherein the fitting is able to accommodate metal-clad cable/flexible metallic conduit having different sheath outer diameters, as well as a different number and/or size of electrical conductors in a conductor bundle.

BACKGROUND OF THE INVENTION

In the electrical fitting art, there have been many different styles of armored cable (AC) connectors, including standard strap-clamp type connectors as well as quick install push-ins or screw on type connectors. Over recent years, there has been an increase in large metal-clad cable (MC) and flexible metallic conduit cable sizes used typically for electrical feeder circuits in commercial buildings and the like and this increased usage has created a need to expand connector fitting trade sizes. As a result of these larger MC and FMC cable sizes, many different fittings would normally be required to handle the specific armor outer diameter (OD) ranges.

In addition, different manufacturers of MC and FMC feeder cable may use a different outer diameter to its metal sheath and/or may use a different electrical conductor bundle configuration, all of which complicate the fitting selection of the cable connector. In addition, various standards organizations, including Underwriter's Laboratories, have issued standards, such as UL514B, that requires any MC/AC/FMC (metal-clad cable/armored cable/flexible metallic conduit) fitting to physically prevent the metal-clad sheath from passing through the throat or end of the fitting, thereby preventing the sheath of the cable from passing into the electrical panel box or the like to which the cable connector is physically mated. Of course, the cable connector must also allow the conductor bundle to readily pass through the throat of the fitting without damage.

U.S. Pat. No. 7,485,806 is directed to an electrical connector for flexible cable which has interchangeable cable armor stops so as to prevent the metal-clad cable or armored cable from passing through the throat, while allowing the conductor bundle to pass through. A single trade size fitting is associated with different plastic cable armor stop bushings according to this patent and the installer then selects the proper bushing to prevent the metal-clad cable or armored cable from passing through the fitting. After installation, the installer would therefore typically discard the unused bushings.

U.S. Pat. No. 8,105,096 is directed to an electrical metal clad connector with different size end stops to adjust a throat diameter of the connector.

Various prior art patents show straps for securing cables that have screws on one side, for example, D518,791; D479,984; D473,783; D530,678; and U.S. Pat. No. 7,022,914.

These patents do not show a strap with a strap adjustment member attached to a second end of a strap curved section, with the strap adjustment member having a plurality of fingers extending therefrom, the fingers arranged in pairs, each pair dimensioned so as to be able to pass through a slot so as to allow adjustment of the strap for various sized cables.

The present invention is directed to a new cable connector which is able to accommodate a range of metal-clad cable/flexible metallic conduit sheath outer diameter sizes, as well as different electrical conductor bundles with a single cable connector. The connector by accepting a wide range of OD sizes and conductor bundle sizes reduces installation time.

SUMMARY OF THE INVENTION

An embodiment of the present invention is an adjustable metal-clad cable (MC)/flexible metallic conduit (FMC) electrical connector for connecting to MC/FMC, the MC/FMC having a sheath, the electrical connector comprising a body with a hollow cylindrical section and an extension member attached to the hollow cylindrical section, the hollow cylindrical section having a slot and a threaded bore passing therethrough, a flange dimensioned for contact with a portion of a panel box or the like around a knockout hole formed therein, and a threaded nipple dimensioned for passage through a knockout hole, the nipple also dimensioned for receipt of a locknut so as to be able to secure the connector to an electrical panel box or the like by tightening a locknut on the nipple, the slot dimensioned to allow passage of a stop plate, and the threaded bore dimensioned to receive an adjustment screw, the extension member comprising a flange with threaded bores formed therein, a curved section attached to the flange at one end of the curved section, and a second flange attached to the curved section at a second end of the curved section, the second flange having a slot formed therethrough, an insulator having a hollow cylindrical bushing at one end dimensioned to be inserted into the hollow cylindrical section of the body, and a curved member flexibly attached to the hollow cylindrical bushing, the curved member extending to a second end of the insulator, the stop plate forming part of the insulator and extending radially outward from the curved member at said second end of the insulator, the stop plate movable by the adjustment screw between a minimum deflection and a maximum deflection, the stop plate correspondingly stopping the sheath of the MC/FMC from passage when connected to the connector, and a strap having a flange with slots formed therein, each slot dimensioned to allow passage of a screw for threaded engagement with one of the threaded bores formed in the flange of the extension member, a curved section having a first end attached to the strap flange, the curved section complementary to the curved section of the extension member, and a strap adjustment member attached to a second end of the strap curved section, the strap adjustment member having a plurality of fingers extending therefrom, the fingers arranged in pairs, each pair of fingers dimensioned so as to be able to pass through the slot of the second flange of the extension member so as to prevent the strap adjustment member from disengaging from said slot, wherein the curved section of the extension member and the curved section of the strap can receive an MC/FMC with a sheath of different outer diameter sizes.

Another embodiment of the present invention is the MC/FMC electrical connector, wherein the stop plate includes indicia indicating the amount of deflection of the stop plate.

Another embodiment of the present invention is the MC/FMC electrical connector, wherein the insulator is fabricated from an electrical insulating material.

A further embodiment of the present invention is the MC/FMC electrical connector, wherein the electrical insulating material includes polypropylene and nylon.

A still further embodiment of the present invention is the MC/FMC electrical connector, wherein the curved member of the insulator includes a recess dimensioned for contact with an end of the adjustment screw to facilitate deflection of the stop plate by deflection of the curved member.

Another embodiment of the present invention is the MC/FMC electrical connector, wherein the hollow cylindrical bushing of the insulator has a flange formed on an end of the bushing so as to contact an end of the threaded nipple so as to facilitate placement of the insulator into the hollow cylindrical section of the body.

Another embodiment of the present invention is the MC/FMC electrical connector, wherein the end of the nipple includes a notch and wherein the flange of the hollow cylindrical bushing of the insulator includes a tab dimensioned for insertion into said notch so as to facilitate placement of the insulator into the hollow cylindrical section of the body and to maintain an orientation therewith.

A further embodiment of the present invention is the MC/FMC electrical connector, wherein the strap adjustment member of the strap includes indicia indicating a maximum and minimum range of sheath outer diameter sizes associated with an MC/FMC that can be connected to the electrical connector.

A further embodiment of the present invention is the MC/FMC electrical connector, wherein the curved section of the extension member and the curved section of the strap each include detents for facilitating attachment to the sheath of the MC/FMC.

A still further embodiment of the present invention is the MC/FMC electrical connector, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

Another embodiment of the present invention is the MC/FMC electrical connector, wherein the strap adjustment member includes a lip extending from an end of the strap adjustment member, the lip to facilitate preventing the strap adjustment member from pulling out of the slot in the second flange of the body during adjustment of the strap.

A further embodiment of the present invention is the MC/FMC electrical connector, wherein the body and strap are fabricated from steel or zinc.

A further embodiment of the present invention is the MC/FMC electrical connector, wherein the strap adjustment member of the strap includes indicia indicating a maximum and minimum range of sheath outer diameter sizes associated with an MC/FMC that can be connected to the electrical connector.

A still further embodiment of the present invention is the MC/FMC electrical connector, wherein the curved section of the extension member and the curved section of the strap each include detents for facilitating attachment to the sheath of the MC/FMC.

Another embodiment of the present invention is the MC/FMC electrical connector, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

Another embodiment of the present invention is the MC/FMC electrical connector, wherein the strap adjustment member includes a lip extending from an end of the strap adjustment member, the lip to facilitate preventing the strap adjustment member from pulling out of the slot in the second flange of the body during adjustment of the strap.

Another embodiment of the present invention is an adjustable metal-clad cable (MC)/flexible metallic conduit (FMC) electrical connector for connecting to MC/FMC, the MC/FMC having an outer sheath, the electrical connector comprising a body with a hollow cylindrical section and an extension member attached to the hollow cylindrical section, the hollow cylindrical section having a slot and a threaded bore passing therethrough, a flange dimensioned for contact with a portion of a panel box or the like around a knockout hole formed therein, and a threaded nipple dimensioned for passage through a knockout hole, the nipple also dimensioned for receipt of a locknut so as to be able to secure the connector to an electrical panel box or the like by tightening a locknut on the nipple, the slot dimensioned to allow passage of a stop plate, and the threaded bore dimensioned to receive an adjustment screw, the extension member comprising a first flange with threaded bores formed therein, a curved section attached to the first flange at one end of the curved section, and a second flange attached to the curved section at a second end of the curved section, an insulator having a hollow cylindrical bushing at one end dimensioned to be inserted into the hollow cylindrical section of the body, and a curved member flexibly attached to the hollow cylindrical bushing, the curved member extending to a second end of the insulator, the stop plate forming part of the insulator and extending radially outward from the curved member at said second end of the insulator, the stop plate movable by the adjustment screw between a minimum deflection and a maximum deflection, the stop plate correspondingly stopping the sheath of the MC/FMC from passage when connected to the connector, and a strap having a first flange with one or more holes formed therein, each hole dimensioned to allow passage of a screw for threaded engagement with one of the threaded bores in the first flange of the extension member, a curved section having a first end attached to the strap first flange, the curved section complementary to the curved section of the extension member, and a second flange with one or more holes formed therein, the second flange attached to a second end of the strap curved section, each hole in the second flange dimensioned to allow passage of a screw for threaded engagement with one of the threaded bores in the second flange of the extension member.

Another embodiment of the present invention is the MC/FMC electrical connector, wherein the stop plate includes indicia indicating the amount of deflection of the stop plate.

A further embodiment of the present invention is the MC/FMC electrical connector, wherein the insulator is fabricated from an electrical insulating material.

A further embodiment of the present invention is the MC/FMC electrical connector, wherein the curved member of the insulator includes a recess dimensioned for contact with an end of the adjustment screw to facilitate deflection of the stop plate by deflection of the curved member.

A still further embodiment of the present invention is the MC/FMC electrical connector, wherein the hollow cylindrical bushing of the insulator has a flange formed on an end of the bushing so as to contact an end of the threaded nipple so as to facilitate placement of the insulator into the hollow cylindrical section of the body.

Another embodiment of the present invention is the MC/FMC electrical connector, wherein the end of the nipple includes a notch and wherein the flange of the hollow cylindrical bushing of the insulator includes a tab dimensioned for insertion into said notch so as to facilitate placement of the insulator into the hollow cylindrical section of the body and to maintain an orientation therewith.

Another embodiment of the present invention is the MC/FMC electrical connector, wherein the curved section of the extension member and the curved section of the strap each include detents for facilitating attachment to the sheath of the MC/FMC.

A further embodiment of the present invention is the MC/FMC electrical connector, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

A further embodiment of the present invention is the MC/FMC electrical connector, wherein the body and strap are fabricated from steel or zinc.

A still further embodiment of the present invention is the MC/FMC electrical connector, wherein the curved section of the extension member and the curved section of the strap each include detents for facilitating attachment to the sheath of the MC/FMC.

Another embodiment of the present invention is the MC/FMC electrical connector, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

Another embodiment of the present invention is the MC/FMC electrical connector, wherein the upstanding flange has a substantially constant radius.

BRIEF DESCRIPTION OF THE DRAWINGS

For a fuller understanding of the nature and objects of the present invention, reference is made to the following detailed description taken in conjunction with the following drawings in which.

DETAILED DESCRIPTION

Figure 1:
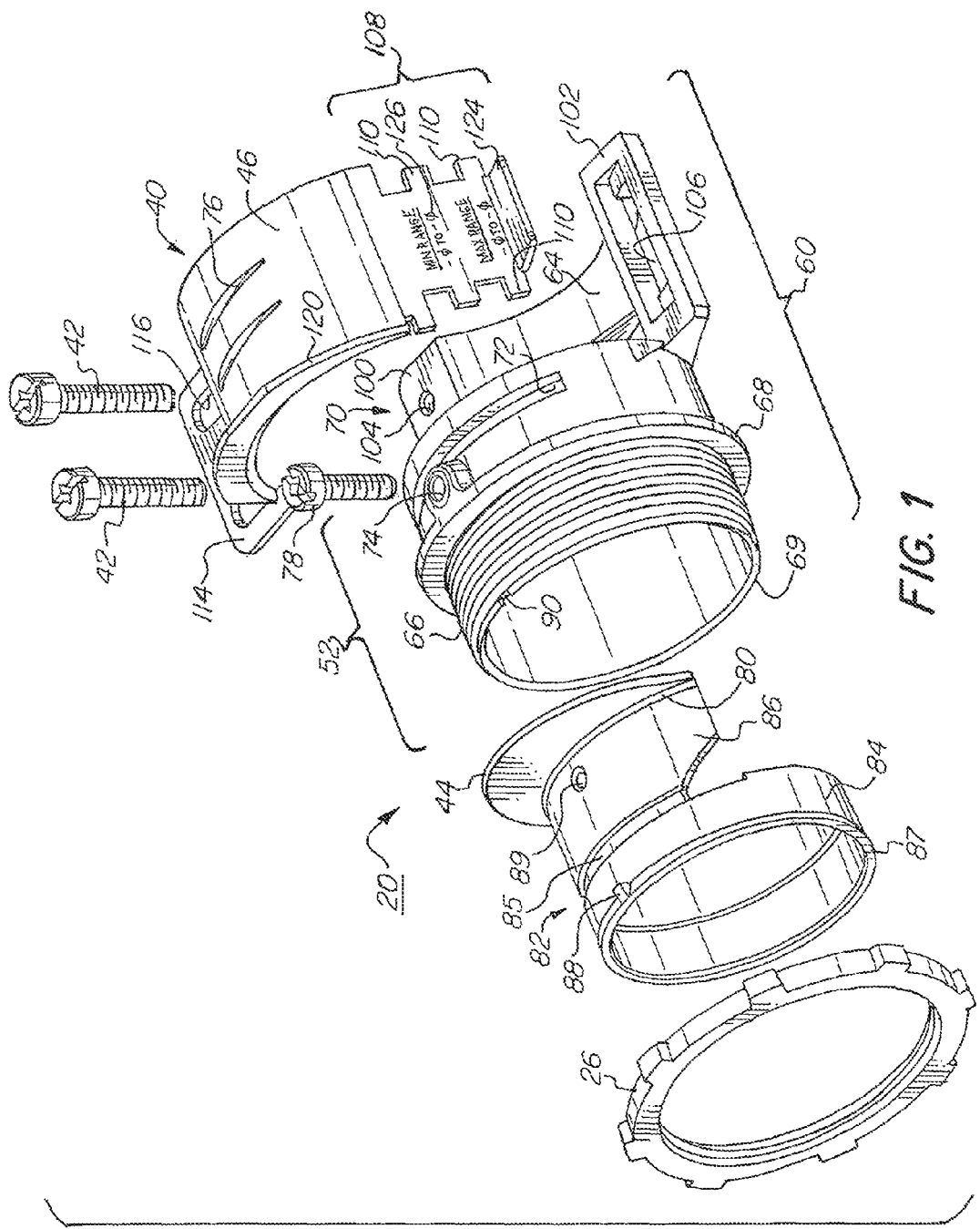
FIG. 1 is an exploded perspective view of an adjustable metal-clad cable/flexible metallic conduit electrical connector according to an embodiment of the present invention.

FIG. 1 is an exploded view of an adjustable metal-clad cable (MC)/flexible metallic conduit (FMC) electrical connector 20 according to the present invention. MC has an electrical conductor bundle 63 formed therewith while FMC has electrical conductors pulled therethrough by an electrician. Such MC, FMC or in general armored cable (AC) has an outer diameter (OD) associated with its outer sheath 28. In general, as used herein, OD of the MC, AC or FMC is with respect to the respective sheath.

Figure 14:
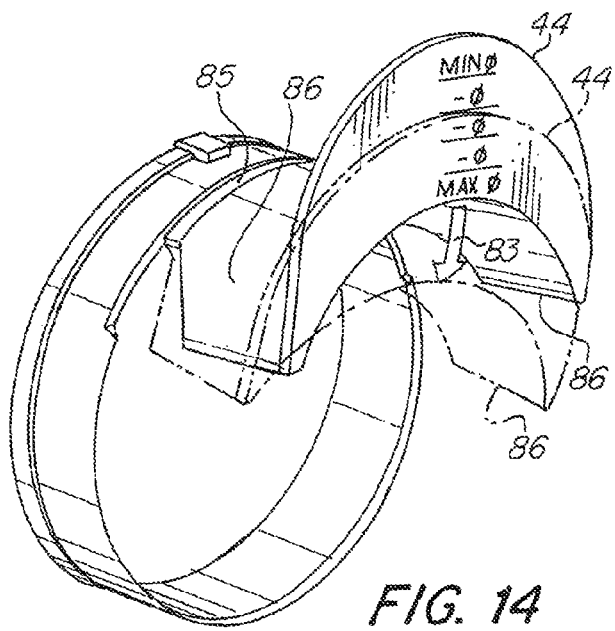
FIG. 14 is a perspective view of an insulator of the adjustable connector showing the range of motion (deflection) of the adjustable stop forming part of the insulator.
Figure 15:
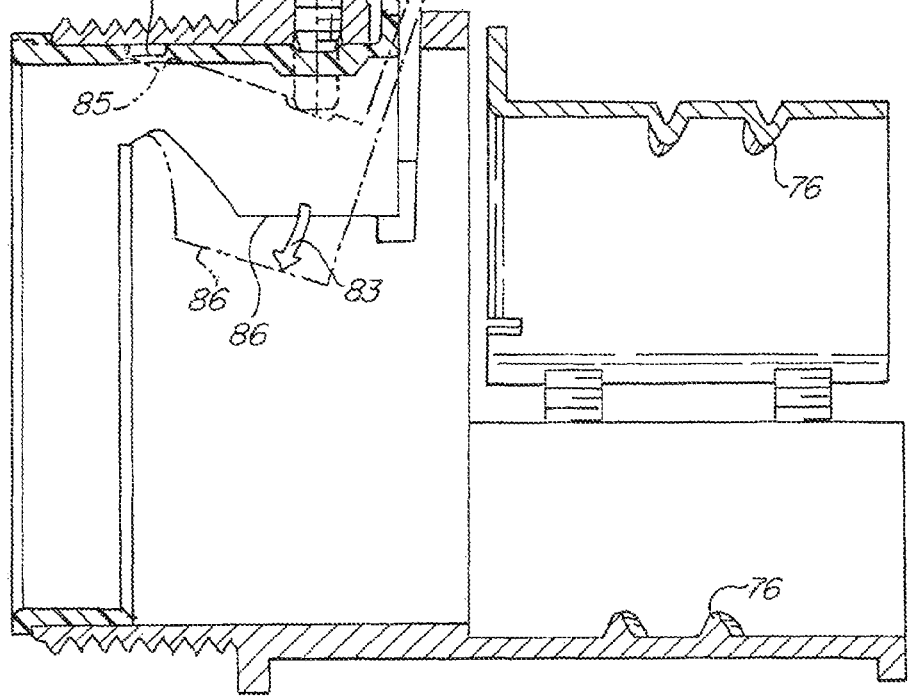
FIG. 15 is an enlarged cross-sectional view of the adjustable connector showing the range of movement (deflection) of the adjustable stop as an adjustment screw is turned.
Figure 16:
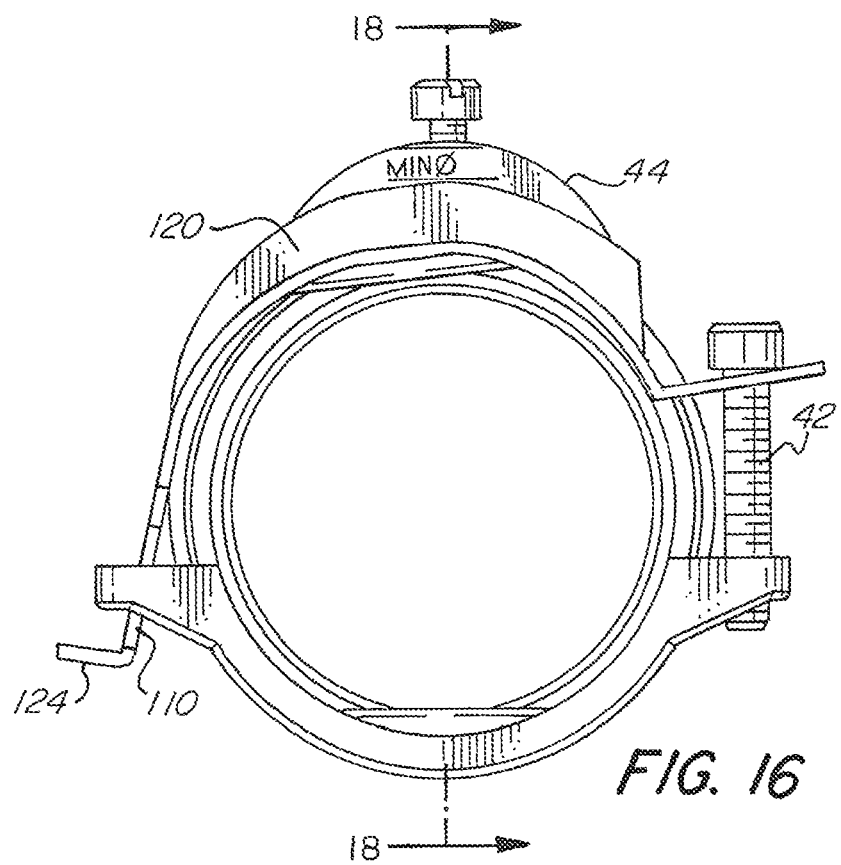
FIG. 16 is a rear view of the adjustable connector with the adjustment screws set to the minimum or zero deflection of the stop plate.
Figure 17:
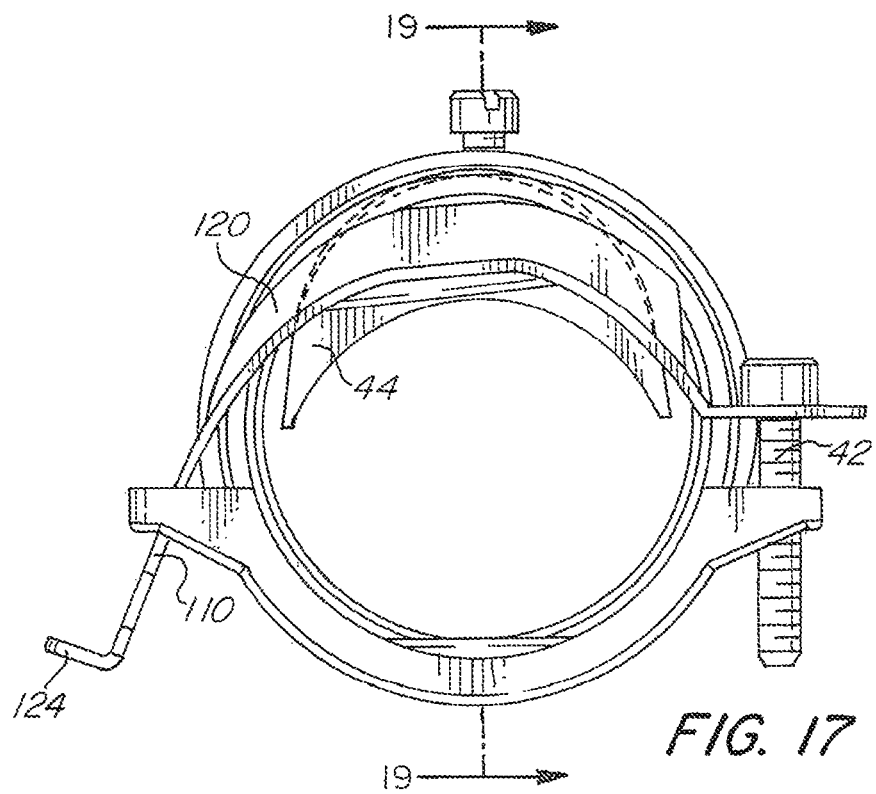
FIG. 17 is a rear view of the adjustable connector with the adjustment screw set to the maximum adjustment (deflection) of the stop plate.
Figure 18:
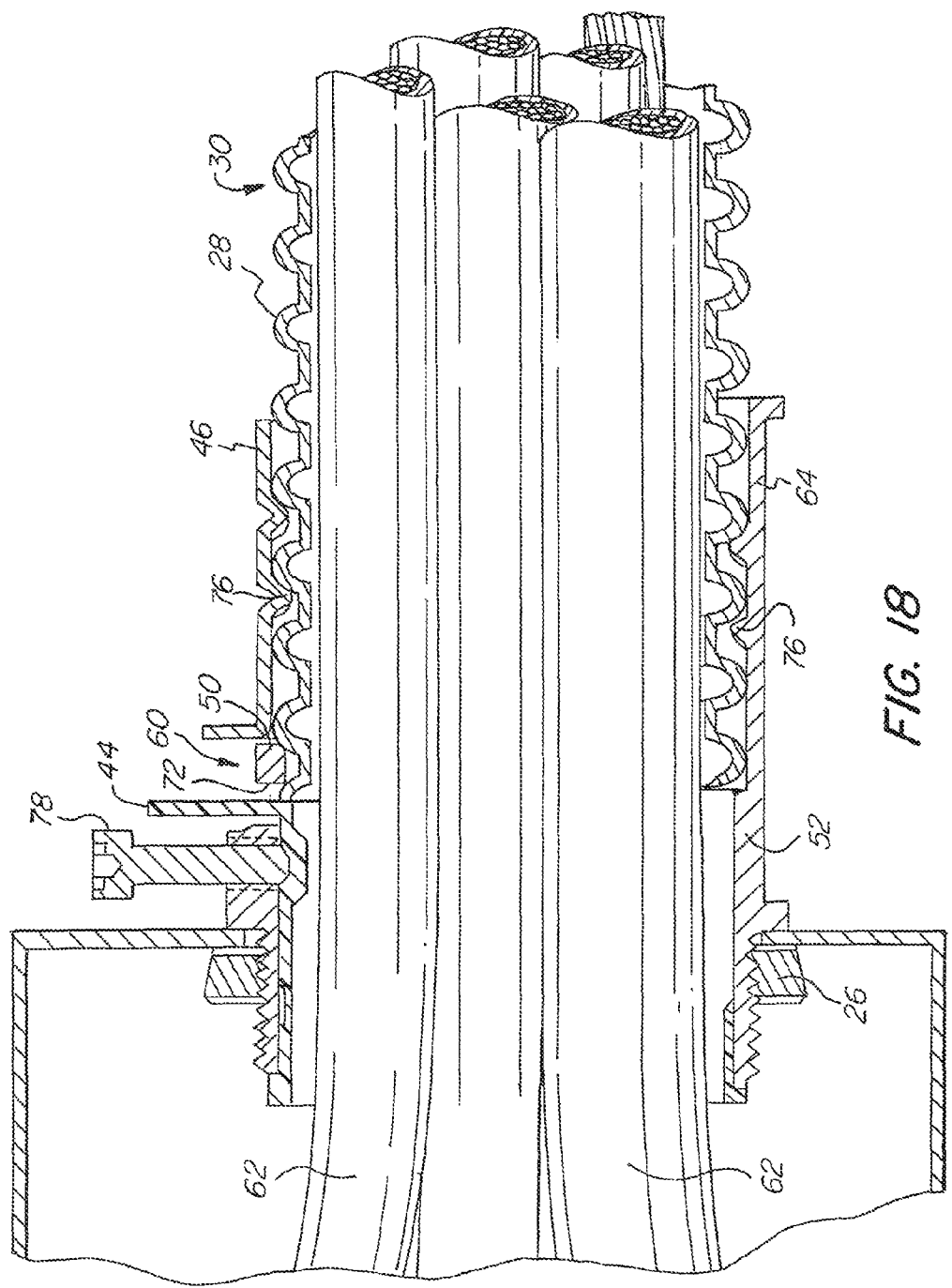
FIG. 18 is an enlarged cross-section view taken along line 18-18 in FIG. 16 showing the adjustment stop at its minimum or zero deflection.
Figure 19:
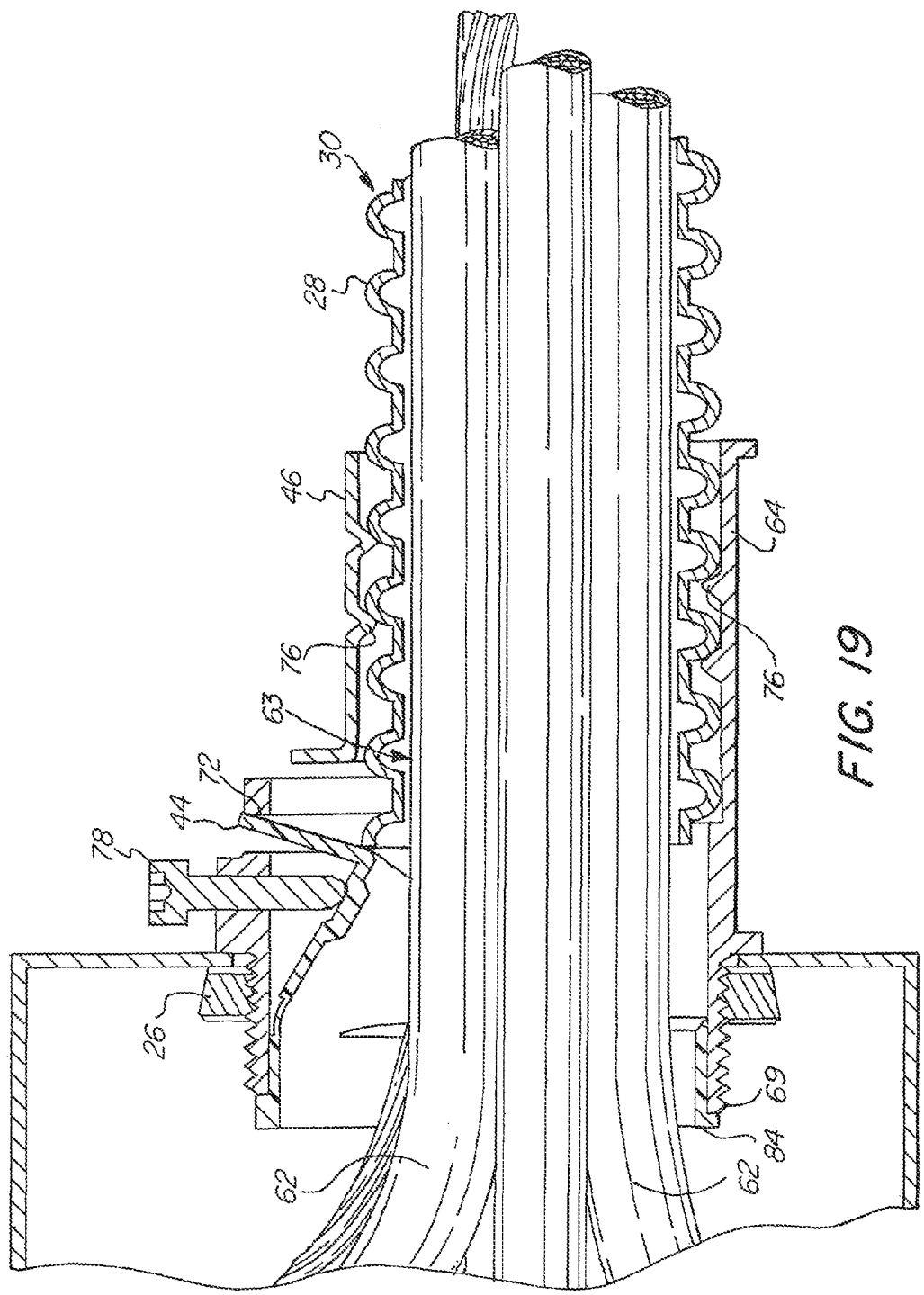
FIG. 19 is a cross-sectional view of the adjustable connector taken along line 19-19 of FIG. 17 showing the adjustment screw urging the adjustable stop toward its maximum deflection so as to stop insertion of the armored sheath of an armored cable of a cable with a relatively small OD.
Figure 20:
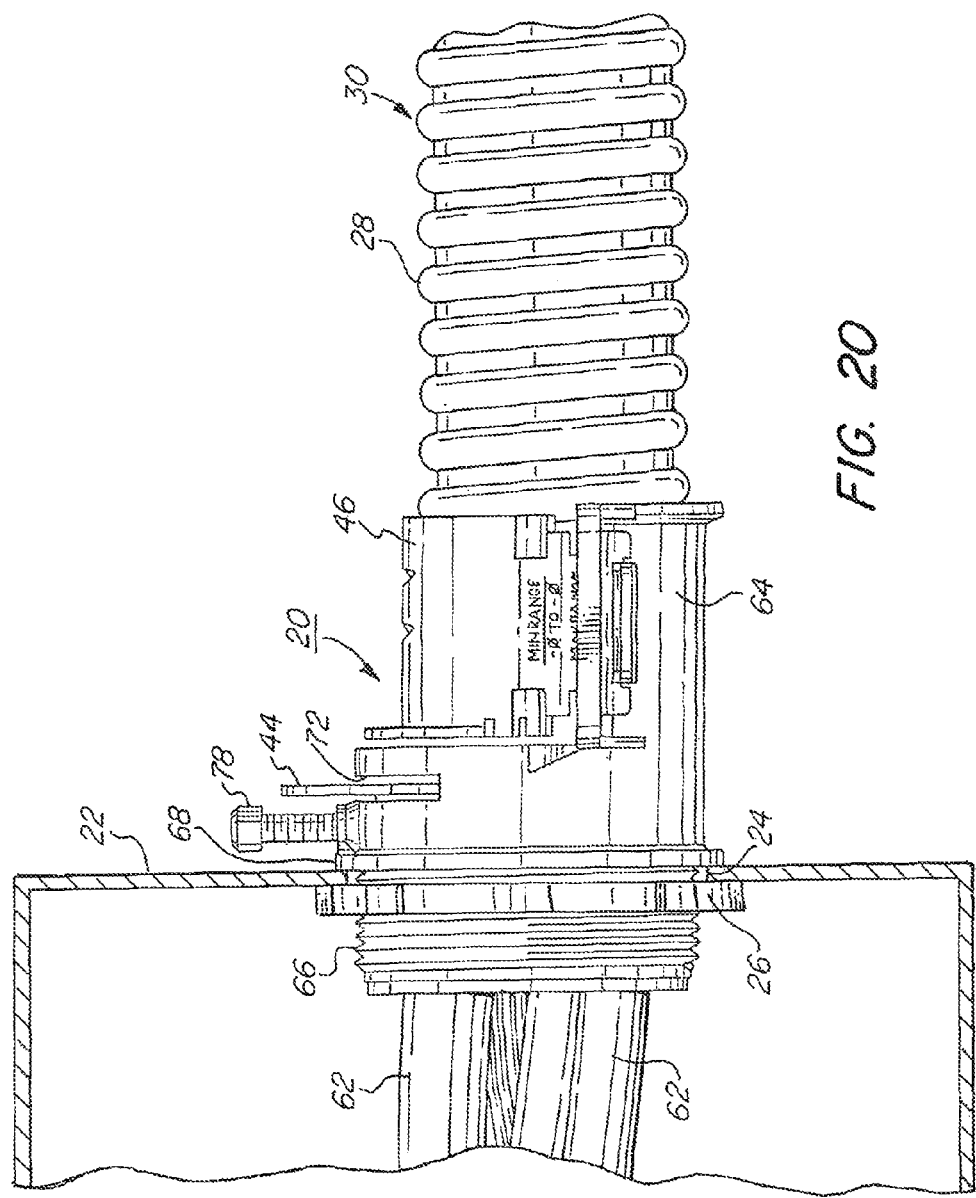
FIG. 20 is a side view of the adjustable connector positioned through a knockout in a panel box or the like and showing a metal-clad cable installed in the connector with the electrical conductors of the electrical bundle of the cable passing into the panel box.

FIG. 20 shows the adjustable connector secured to an electrical panel box 22 through a knockout hole 24 formed in the panel box and with the adjustable connector secured by means of a locknut 26. As seen in FIG. 20, the sheath 28 of an MC/FMC 30 is secured to the adjustable connector by tightening a strap 40 by means of screws 42, with the cable sheath 28 contacting a stop plate 44 as shown in FIG. 19 for a smaller outer diameter (OD) MC/FMC or, as shown in FIG. 18, contacting the stop plate for a large OD MC/FMC. This allows electrical conductors 62 of an electrical conductor bundle 63 to pass into the panel box 22 or the like while preventing the sheath from entering the panel box. The stop plate can be adjusted to accommodate a wide range of sheath OD's while allowing passage of the conductor bundle. This is seen in FIGS. 14 and 15 when turning adjustment screw 78 as shown by turn arrow 79, which causes linear movement to screw 78 as shown by arrow 81, which in turn moves stop plate 44 to various positions as shown by arrow 83 and dashed positions of stop plate 44.

As will be described more fully below, the strap 40 in combination with the adjustable stop plate 44 can accommodate a wide selection of sheath OD's between maximum and minimum deflection of the stop plate in a simple and straightforward manner.

As also seen in FIGS. 12, 13 and 15-20, both a curved section 46 of strap 40 and a curved section 64 of extension member 70 include elongated detents 76 for assistance in holding sheath 28 of FMC 30 to the overall adjustable connector 20.

As seen in FIGS. 1 and 18-20, body 60 has a hollow cylindrical section that includes a threaded nipple 66 and a flange 68. As seen in FIG. 20, the flange 68 abuts a knockout hole 24 when the nipple is inserted through the knockout hole and thereby enables securement of the adjustable connector to the panel box 22 by tightening of locknut 26.

As seen in FIG. 1, body 60 also includes a slot 72 dimensioned for passage of stop plate 44 as seen in FIGS. 18-20. The body 60 also includes a threaded bore 74 for receipt of an adjustment screw 78 thereby providing an easy method for adjusting stop plate 44 depending upon the OD of the MC/FMC. Body 60 can be fabricated from steel, aluminum or die-cast zinc, or other material which can provide the strength required to hold an MC/FMC cable.

As seen in FIG. 1, the stop plate 44 is part of an insulator 82 and is integrally formed as part of the insulator at a second end 80 of the insulator 82. The insulator also includes a hollow cylindrical bushing 84 and a curved member 86, both for placement within a hollow nipple 66 of body 60, with the cylindrical member 84 positioned essentially flush with an end 69 of nipple 66 by contact of flange 86 with end 69. The curved member is flexibly attached to the cylindrical member via an integral hinge 85 formed therein. The insulator can be fabricated from a plastic, such as polypropylene, nylon or other flexible material.

As seen in FIG. 1, flange 87 includes a tab 88 which is dimensioned for insertion in slot 90 of nipple 66 so as to resist turning of the insulator relative to body 60.

As seen in FIGS. 1, 18 and 19, adjustment screw 78 passes through bore 74 and contacts a recess 89 formed in curved section 86 of insulator 82.

Figure 7:
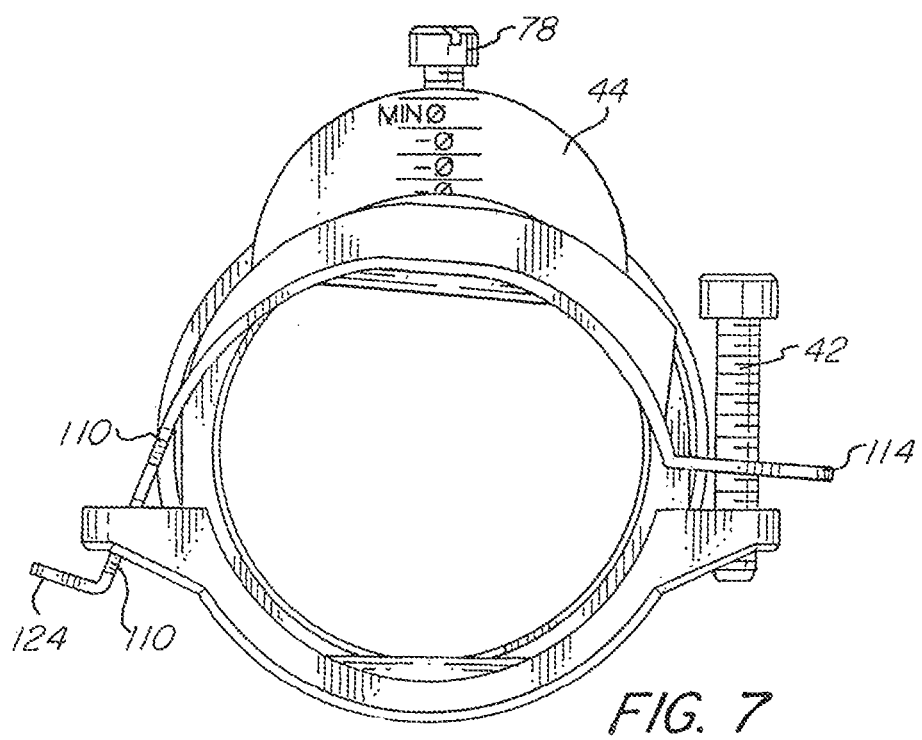
FIG. 7 is a rear view of the connector.
Figure 8:
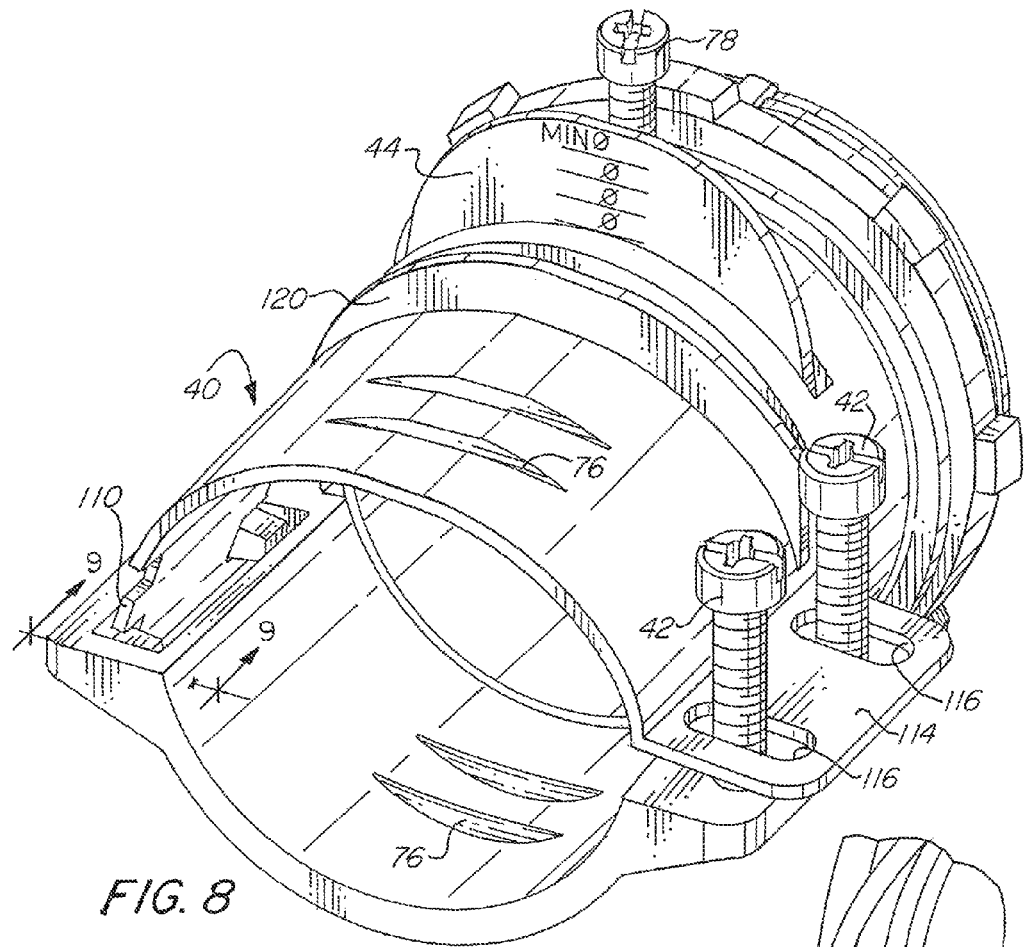
FIG. 8 is an enlarged perspective view of the connector.

As seen in FIGS. 7 and 8, stop plate 44 includes indicia 96 to assist in adjustment of the stop plate depending upon the OD of the MC/FMC to be inserted within the adjustable connector. The indicia typically show the maximum size sheath OD (minimum or zero deflection of the stop plate) to the minimum size sheath OD (maximum deflection of the stop plate)—see FIGS. 16-19.

Figure 9:
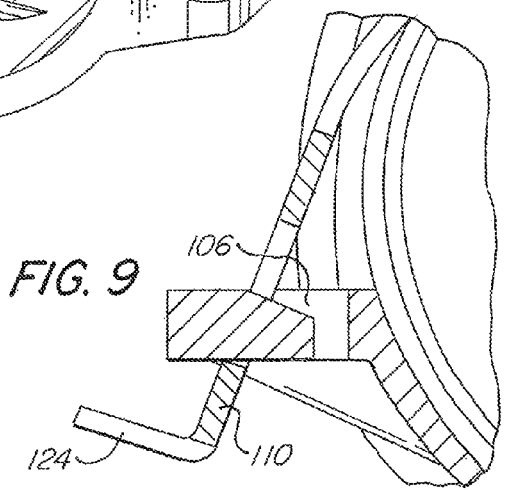
FIG. 9 is an enlarged cross-sectional view of a portion of a strap adjustment member showing its orientation when positioned through a slot formed in an extension member of a body of the connector.
Figure 11:
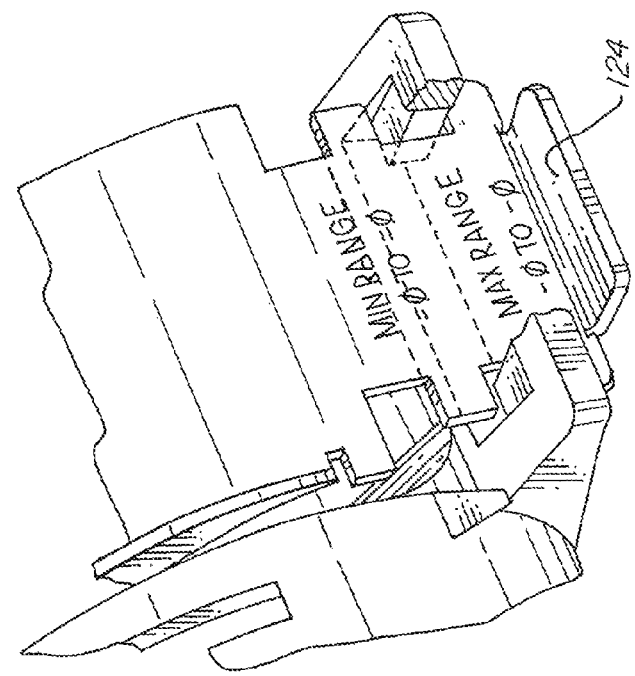
FIG. 11 is a partial enlarged view of the strap adjustment member positioned in the slot formed in the extension member of the body.

As seen in FIGS. 1, 8 and 9, extension member 70 of body 60 includes a flange 100, curved section 64 and a second flange 102 attached to the curved section at a second end of the curved section relative to flange 100.

Figure 3:
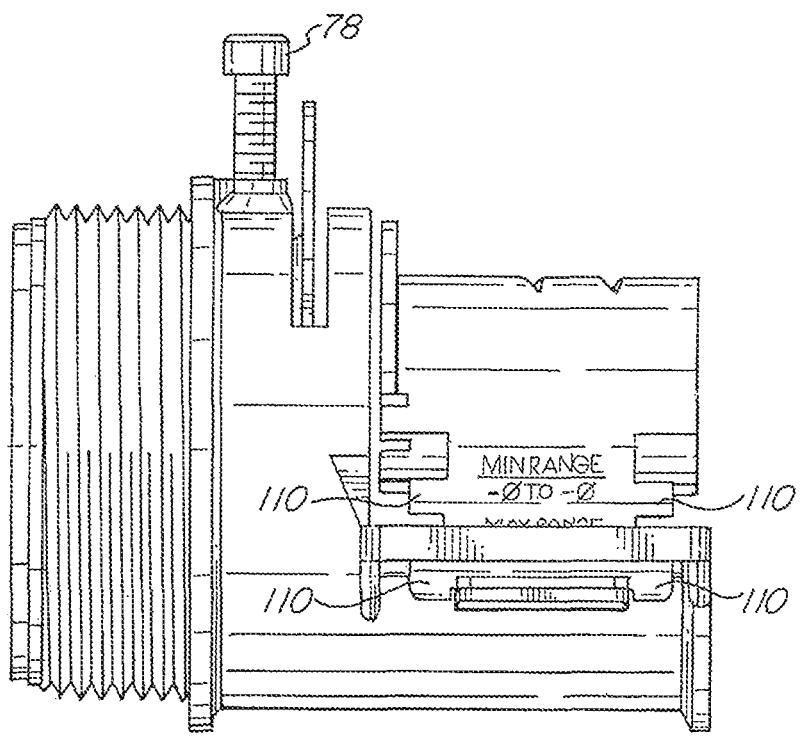
FIG. 3 is a right side view of the connector.
Figure 4:
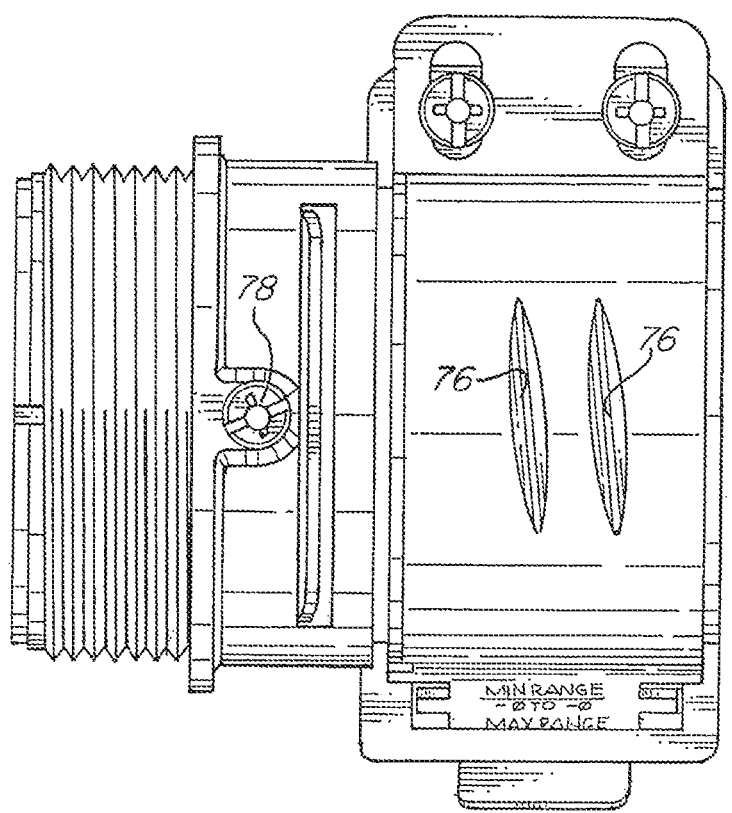
FIG. 4 is a top plan view of the connector.
Figure 5:
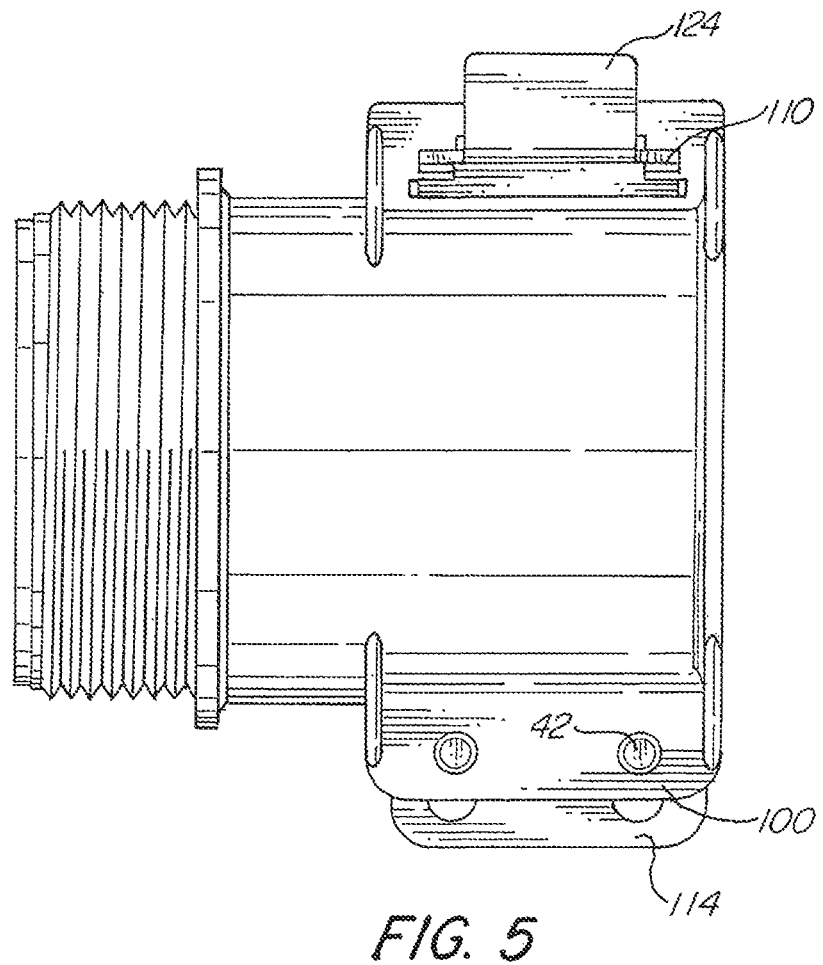
FIG. 5 is a bottom view of the connector.
Figure 6:
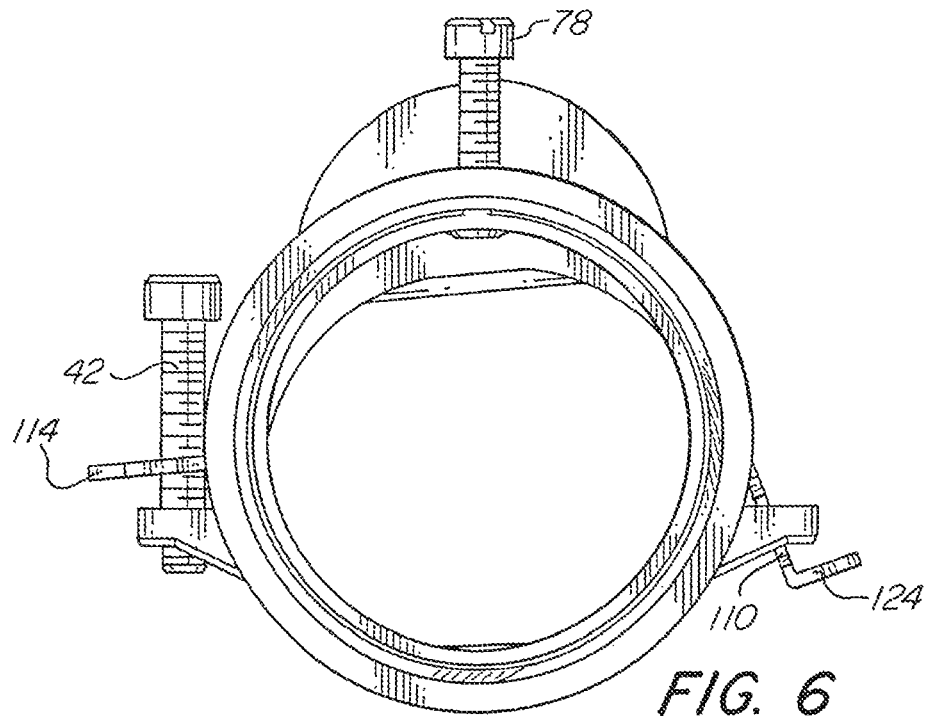
FIG. 6 is a front view of the connector.

Flange 100 includes threaded bores 104 for receipt of screws 42. Second flange 102 has a slot 106 formed therein for receipt of fingers 110, with the fingers dimensioned for contacting the outer perimeter of the slot as best seen in FIG. 3. Thus, a pair of fingers 102 can be selected depending upon the OD of the MC/FMC to be inserted within the adjustable connector.

Figure 2:
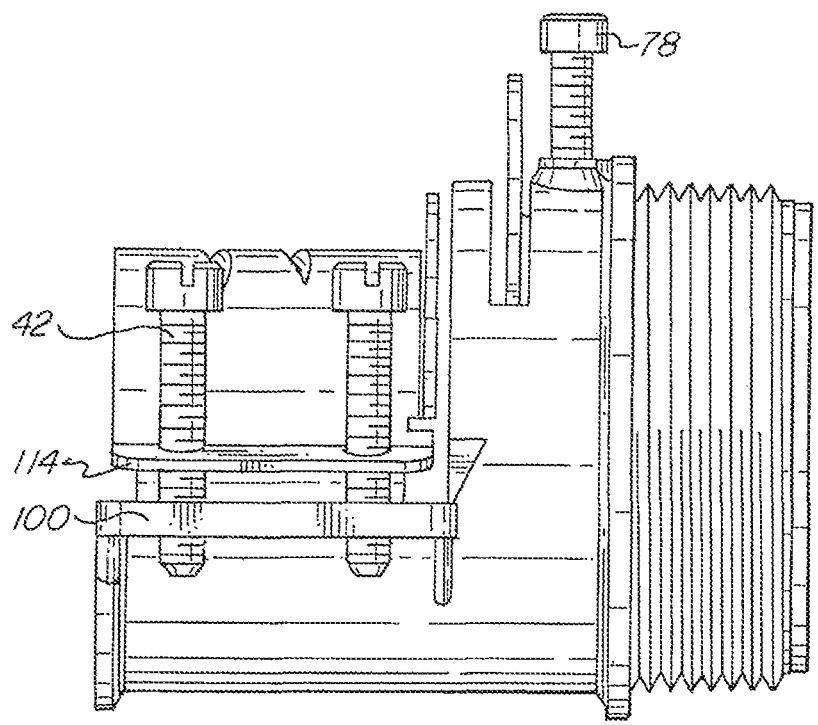
FIG. 2 is a left side view of the connector.

As seen in FIGS. 1, 2 and 8, strap 40 includes a flange 114 having a pair of slots 116 formed therein to facilitate passage of screws 42 therethrough. The slots allow sufficient movement of the overall strap relative to extension member 70 to facilitate placement around an MC/FMC that is to be inserted within the adjustable connector.

Strap 40 further includes a curved section 46 having an upstanding flange 120 which when installed is placed closest to stop plate 44. This is best seen in FIG. 8. The flange covers the space between the strap and body 60 that would otherwise be exposed when the OD of the MC/FMC is small. This is seen in FIG. 19. Closing this space is required by electrical codes to prevent insertion of extraneous objects into the connector. Strap 40 further includes flange 114 as discussed above.

Figure 10:
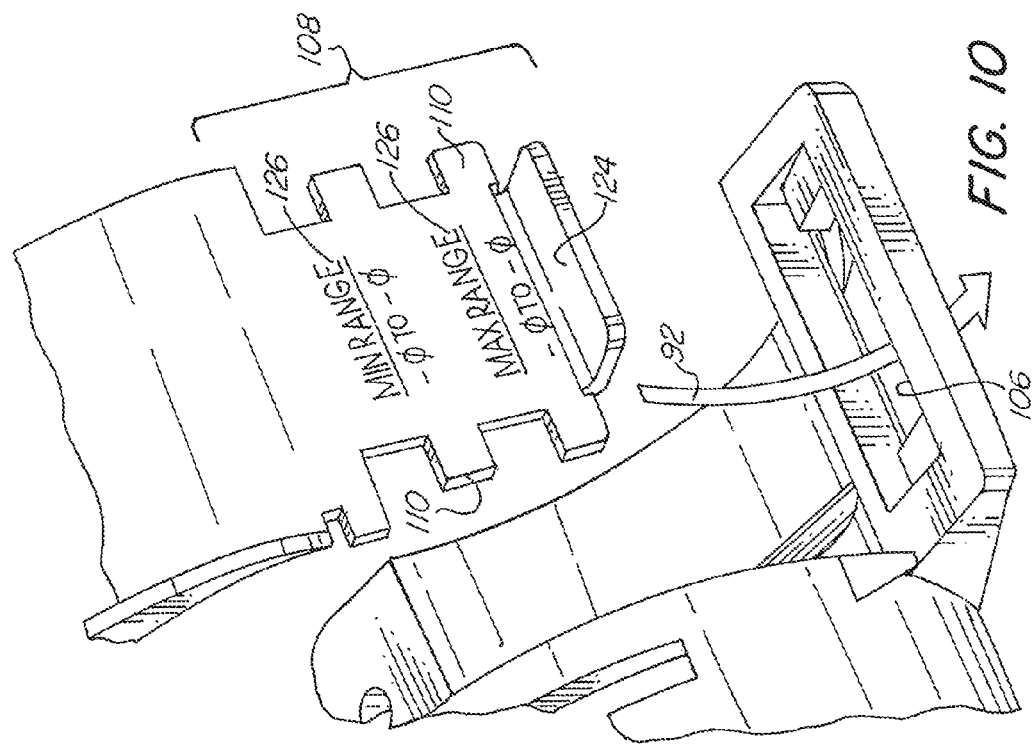
FIG. 10 is an enlarged perspective view of the strap adjustment member positioned for insertion through a slot formed in the extension member with the arrow showing the direction for such insertion.
Figure 12:
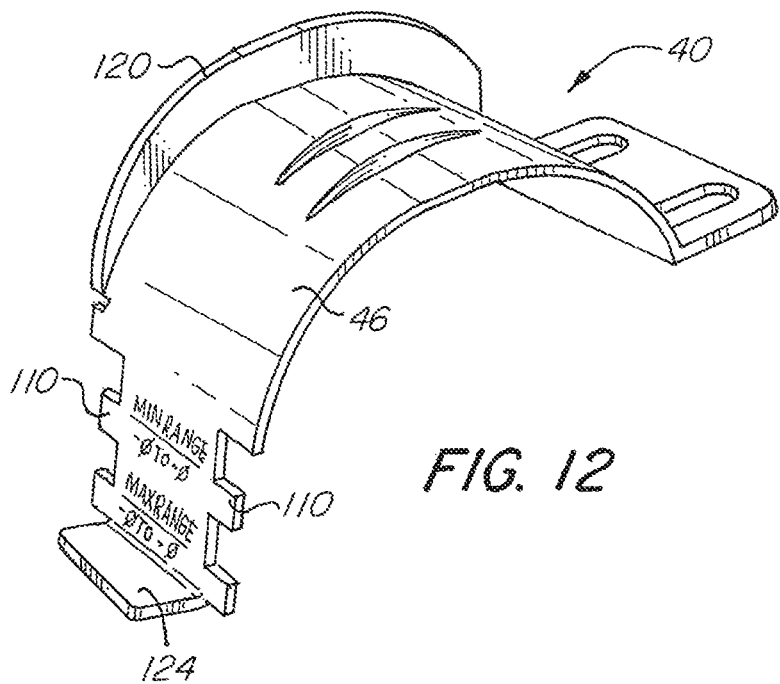
FIG. 12 is a perspective view of the overall strap of the connector.
Figure 13:
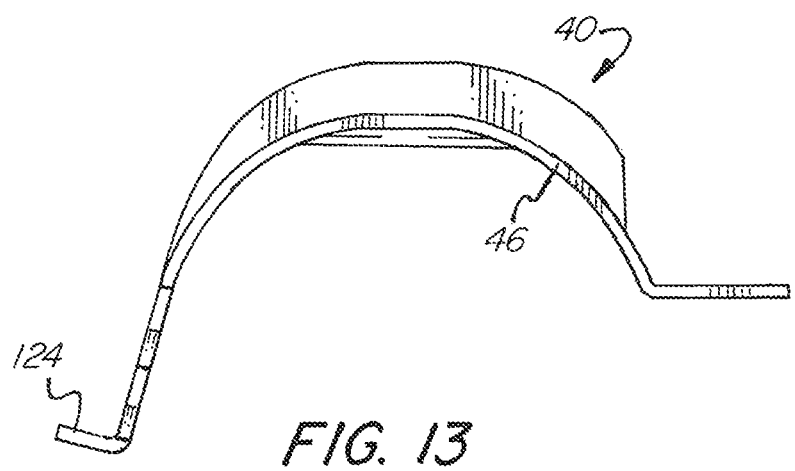
FIG. 13 is a side view of the strap.

Strap 40 includes a strap adjustment member 108 that includes a plurality of fingers 110 arranged in pairs (e.g., pair 110'). Each pair is dimensioned so as to be able to pass through slot 106 (by slightly tilting strap 40) and then contacting the outer perimeter of the slot as discussed above. Insertion is shown in FIG. 10 by arrow 92. The strap in combination with extension member 70 can thereby accommodate a relatively large range of OD's of the MC/FMC.

The strap adjustment member also may have an extending lip 124 which helps prevent accidental removal of the strap adjustment member from the extension member of the body while positioning the strap about the MC/FMC prior to tightening of screws 42.

Figure 21:
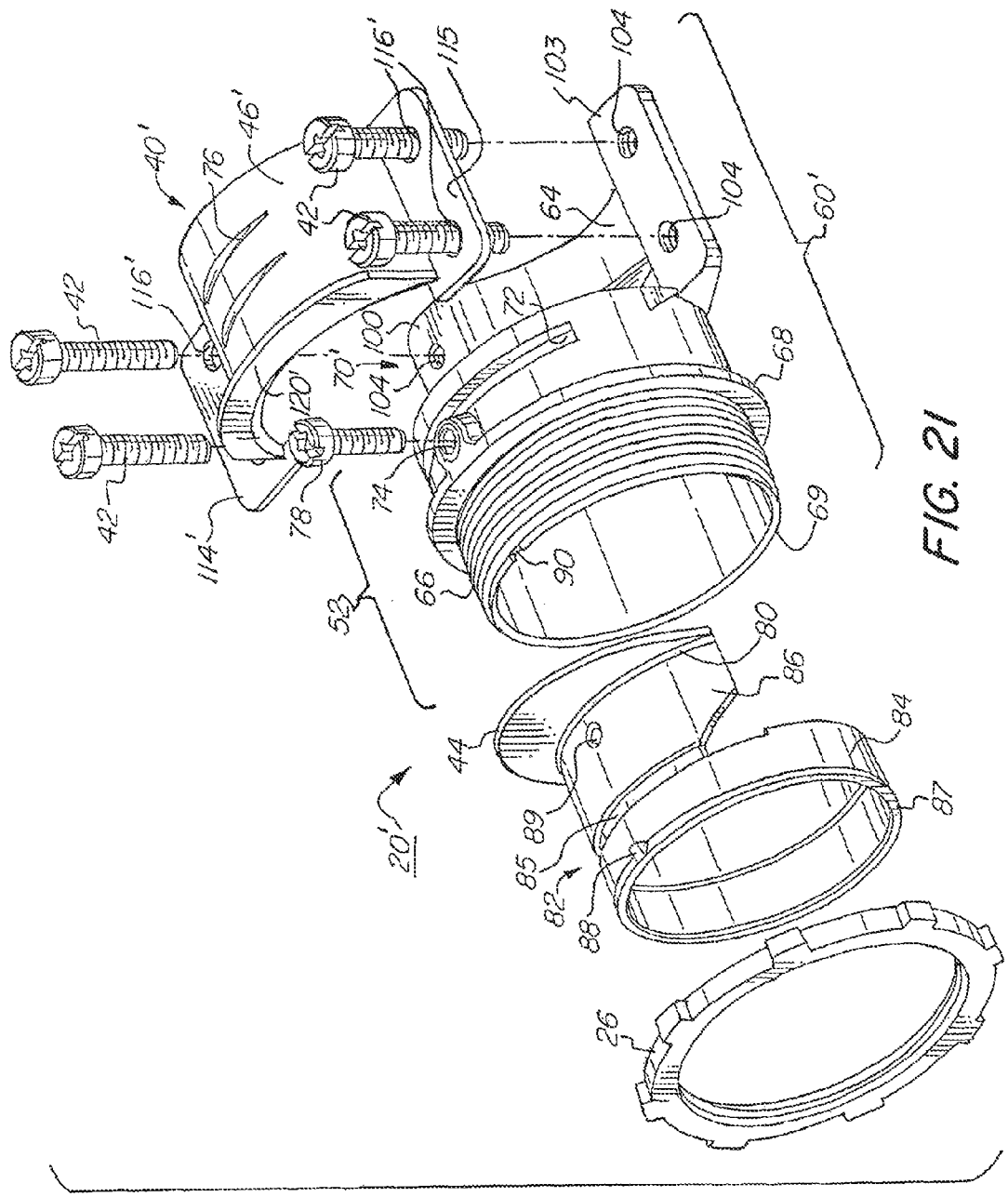
FIG. 21 is an exploded view of an alternative embodiment of the connector.
Figure 22:
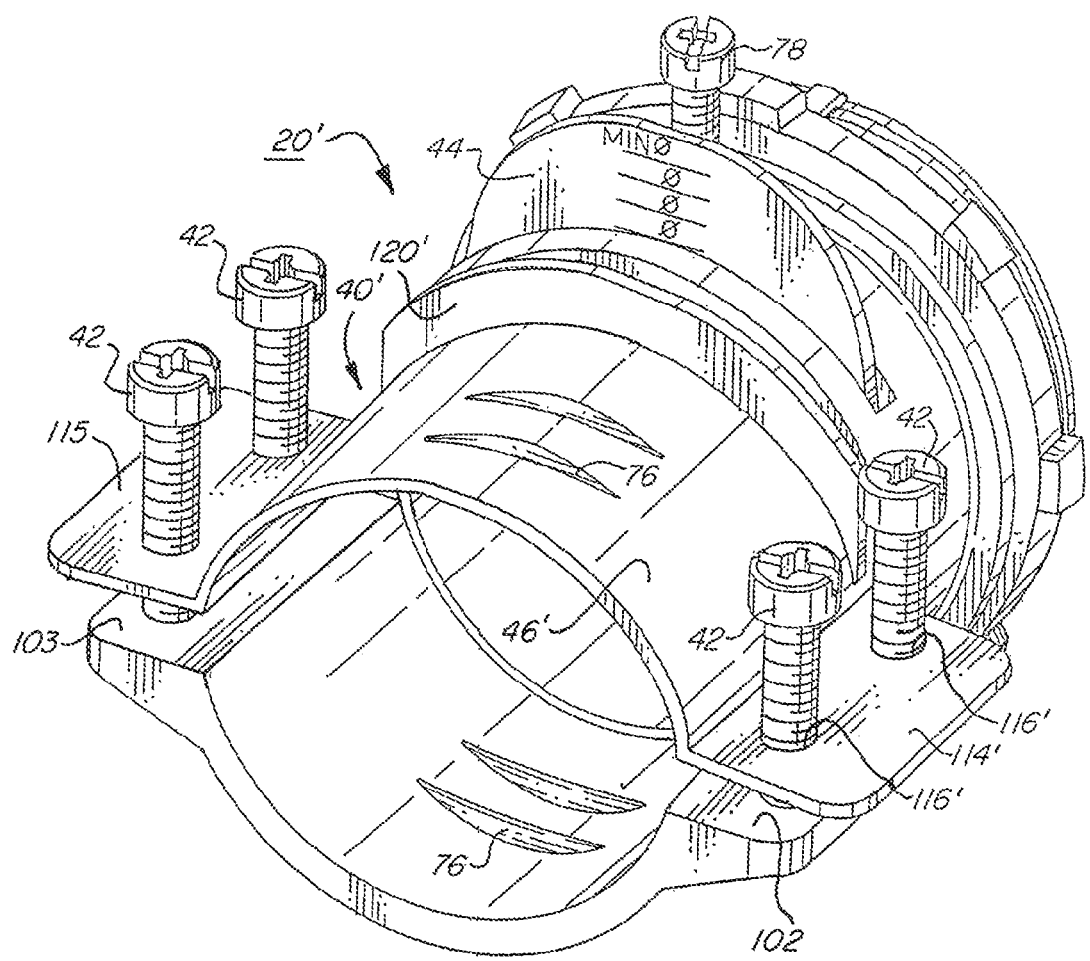
FIG. 22 is an enlarged perspective view of the embodiment shown in FIG. 21.

FIGS. 21 and 22 show an alternative embodiment 20' of the adjustable connector. In this alternative embodiment, an extension member 70' of body 60' has a second flange 103 which is similar to first flange 102' and includes one or more threaded bores 104 (two bores shown, but one or more bores could be used). A strap 40' includes a second flange 115 similar to first flange 114' with both flanges having one or more corresponding circular holes 116' for the passage of screws 42. In this embodiment, the upstanding flange 120' has a uniform radius since this embodiment of the strap does not pivot in the manner that the first embodiment pivots. This conventional strap can be used in situations where the embodiment of the first adjustable strap arrangement is not required or needed.

As seen in FIGS. 18 and 19, the strap 40 can accommodate a wide range of outer diameters associated with the MC/FMC to be inserted within the adjustable cable. Furthermore, as seen in FIGS. 1 and 9, the portion of the strap 40 associated with fingers 110 may include indicia 126 to assist the installer as to which pair of fingers to use depending upon the OD of the MC/FMC to be used with the adjustable connector.

The overall result of this adjustable MC/FMC conduit connector is that it provides a relatively large range of adjustment with respect to the OD of the MC/FMC to be used within a particular trade size and can accommodate various cable manufacturers combination of sheath (armor) OD and conductor bundle sizes. Furthermore, the insulator includes an integral stop plate which prevents the sheath of the MC/FMC from entering the knockout hole of the associated panel box or the like while allowing the conductor bundle of the MC or the conductors in the FMC to pass through the knockout hole. Furthermore, by use of only two screws to secure the strap to the overall connector, a heavy duty adjustable strap is obtained which is readily secured to the sheath of the MC/FMC and is in general more convenient to install than straps requiring screws on both sides thereof.

The overall adjustable connector is therefore easy to install resulting in time savings and therefore less costly installations.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An adjustable metal-clad cable (MC)/flexible metallic conduit (FMC) electrical connector for connecting to MC/FMC, the MC/FMC having an outer sheath, the electrical connector comprising:

a body with a hollow cylindrical section and an extension member attached to the hollow cylindrical section, the hollow cylindrical section having a slot and a threaded bore passing therethrough, a flange dimensioned for contact with a portion of a panel box or the like around a knockout hole formed therein, and a threaded nipple dimensioned for passage through a knockout hole, the nipple also dimensioned for receipt of a locknut so as to be able to secure the connector to an electrical panel box or the like by tightening a locknut on the nipple, the slot dimensioned to allow passage of a stop plate, and the threaded bore dimensioned to receive an adjustment screw, the extension member comprising a flange with threaded bores formed therein, a curved section attached to the flange at one end of the curved section, and a second flange attached to the curved section at a second end of the curved section, the second flange having a slot formed therethrough;

an insulator having a hollow cylindrical bushing at one end dimensioned to be inserted into the hollow cylindrical section of the body, and a curved member flexibly attached to the hollow cylindrical bushing, the curved member extending to a second end of the insulator, the stop plate forming part of the insulator and extending radially outward from the curved member at said second end of the insulator, the stop plate movable by the adjustment screw between a minimum deflection and a maximum deflection, the stop plate correspondingly stopping the sheath of the MC/FMC from passage when connected to the connector; and a strap having a flange with slots formed therein, each slot dimensioned to allow passage of a screw for threaded engagement with one of the threaded bores formed in the flange of the extension member, a curved section having a first end attached to the strap flange, the curved section complementary to the curved section of the extension member, and a strap adjustment member attached to a second end of the strap curved section, the strap adjustment member having a plurality of fingers extending therefrom, the fingers arranged in pairs, each pair of fingers dimensioned so as to be able to pass through the slot of the second flange of the extension member so as to prevent the strap adjustment member from disengaging from said slot, wherein the curved section of the extension member and the curved section of the strap can receive an MC/FMC with a sheath of different outer diameter sizes.

2. The MC/FMC electrical connector according to claim 1, wherein the curved member of the insulator includes a recess dimensioned for contact with an end of the adjustment screw to facilitate deflection of the stop plate by deflection of the curved member.

3. The MC/FMC electrical connector according to claim 1, wherein the body and strap are fabricated from steel or zinc.

4. The MC/FMC electrical connector according to claim 1, wherein the strap adjustment member of the strap includes indicia indicating a maximum and minimum range of sheath outer diameter sizes associated with an MC/FMC that can be connected to the electrical connector.

5. The MC/FMC electrical connector according to claim 1, wherein the curved section of the extension member and the curved section of the strap each include detents for facilitating attachment to the sheath of the MC/FMC.

6. The MC/FMC electrical connector according to claim 1, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

7. The MC/FMC electrical connector according to claim 1, wherein the strap adjustment member includes a lip extending from an end of the strap adjustment member, the lip to facilitate preventing the strap adjustment member from pulling out of the slot in the second flange of the body during adjustment of the strap.

8. The MC/FMC electrical connector according to claim 1, wherein the stop plate includes indicia indicating the amount of deflection of the stop plate.

9. The MC/FMC electrical connector according to claim 8, wherein the insulator is fabricated from an electrical insulating material.

10. The MC/FMC electrical connector according to claim 9, wherein the electrical insulating material includes polypropylene and nylon.

11. The MC/FMC electrical connector according to claim 1, wherein the hollow cylindrical bushing of the insulator has a flange formed on an end of the bushing so as to contact an end of the threaded nipple so as to facilitate placement of the insulator into the hollow cylindrical section of the body.

12. The MC/FMC electrical connector according to claim 11, wherein the end of the nipple includes a notch and wherein the flange of the hollow cylindrical bushing of the insulator includes a tab dimensioned for insertion into said notch so as to facilitate placement of the insulator into the hollow cylindrical section of the body and to maintain an orientation therewith.

13. The MC/FMC electrical connector according to claim 12, wherein the strap adjustment member of the strap includes indicia indicating a maximum and minimum range of sheath outer diameter sizes associated with an MC/FMC that can be connected to the electrical connector.

14. The MC/FMC electrical connector according to claim 13, wherein the curved section of the extension member and the curved section of the strap each include detents for facilitating attachment to the sheath of the MC/FMC.

15. The MC/FMC electrical connector according to claim 14, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

16. The MC/FMC electrical connector according to claim 15, wherein the strap adjustment member includes a lip extending from an end of the strap adjustment member, the lip to facilitate preventing the strap adjustment member from pulling out of the slot in the second flange of the body during adjustment of the strap.

17. The MC/FMC electrical connector according to claim 16, wherein the strap adjustment member includes a plurality of fingers extending outwardly therefrom in pairs, wherein each finger pair is dimensioned for contacting the second flange of the extension member after passage through the slot in the second flange, thereby providing a range of adjustments for the strap.

18. An adjustable metal-clad cable (MC)/flexible metallic conduit (FMC) electrical connector for connecting to MC/FMC, the MC/FMC having an outer sheath, the electrical connector comprising:

a body with a hollow cylindrical section and an extension member attached to the hollow cylindrical section, the hollow cylindrical section having a slot and a threaded bore passing therethrough, a flange dimensioned for contact with a portion of a panel box or the like around a knockout hole formed therein, and a threaded nipple dimensioned for passage through a knockout hole, the nipple also dimensioned for receipt of a locknut so as to be able to secure the connector to an electrical panel box or the like by tightening a locknut on the nipple, the slot dimensioned to allow passage of a stop plate, and the threaded bore dimensioned to receive an adjustment screw, the extension member comprising a first flange with threaded bores formed therein, a curved section attached to the first flange at one end of the curved section, and a second flange attached to the curved section at a second end of the curved section;

an insulator having a hollow cylindrical bushing at one end dimensioned to be inserted into the hollow cylindrical section of the body, and a curved member flexibly attached to the hollow cylindrical bushing, the curved member extending to a second end of the insulator, the stop plate forming part of the insulator and extending radially outward from the curved member at said second end of the insulator, the stop plate movable by the adjustment screw between a minimum deflection and a maximum deflection, the stop plate correspondingly stopping the sheath of the MC/FMC from passage when connected to the connector; and a strap having a first flange with one or more holes formed therein, each hole dimensioned to allow passage of a screw for threaded engagement with one of the threaded bores in the first flange of the extension member, a curved section having a first end attached to the strap first flange, the curved section complementary to the curved section of the extension member, and a second flange with one or more holes formed therein, the second flange attached to a second end of the strap curved section, each hole in the second flange dimensioned to allow passage of a screw for threaded engagement with one of the threaded bores in the second flange of the extension member.

19. The MC/FMC electrical connector according to claim 18, wherein the curved member of the insulator includes a recess dimensioned for contact with an end of the adjustment screw to facilitate deflection of the stop plate by deflection of the curved member.

20. The MC/FMC electrical connector according to claim 18, wherein the body and strap are fabricated from steel or zinc.

21. The MC/FMC electrical connector according to claim 18, wherein the curved section of the extension member and the curved section of the strap each include detents for facilitating attachment to the sheath of the MC/FMC.

22. The MC/FMC electrical connector according to claim 18, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

23. The MC/FMC electrical connector according to claim 22, wherein the upstanding flange has a substantially constant radius.

24. The MC/FMC electrical connector according to claim 18, wherein the stop plate includes indicia indicating the amount of deflection of the stop plate.

25. The MC/FMC electrical connector according to claim 24, wherein the insulator is fabricated from an electrical insulating material.

26. The MC/FMC electrical connector according to claim 18, wherein the hollow cylindrical bushing of the insulator has a flange formed on an end of the bushing so as to contact an end of the threaded nipple so as to facilitate placement of the insulator into the hollow cylindrical section of the body.

27. The MC/FMC electrical connector according to claim 26, wherein the end of the nipple includes a notch and wherein the flange of the hollow cylindrical bushing of the insulator includes a tab dimensioned for insertion into said notch so as to facilitate placement of the insulator into the hollow cylindrical section of the body and to maintain an orientation therewith.

28. The MC/FMC electrical connector according to claim 18, wherein the curved section of the extension member and the curved section of the strap each include detents for facilitating attachment to the sheath of the MC/FMC.

29. The MC/FMC electrical connector according to claim 28, wherein the curved section of the strap includes an upstanding flange protruding radially outward from one end of the curved section so as to help prevent entry of extraneous material into the body of the connector when the strap is adjusted between a maximum and minimum outer diameter for the associated MC/FMC.

* * * * *